(12) United States Patent
McColloch

(10) Patent No.: US 8,529,140 B2
(45) Date of Patent: Sep. 10, 2013

(54) METHOD AND APPARATUS FOR USE IN A PARALLEL OPTICAL COMMUNICATIONS SYSTEM FOR PASSIVELY ALIGNING AN OPTICS MODULE WITH OPTOELECTRONIC DEVICES OF THE PARALLEL OPTICAL COMMUNICATIONS MODULE

(75) Inventor: Laurence R. McColloch, Santa Clara, CA (US)

(73) Assignee: Avago Technologies General IP (Singapore) Pte. Ltd. (SG)

( * ) Notice: Subject to any disclaimer, the term of this patent is extended or adjusted under 35 U.S.C. 154(b) by 84 days.

(21) Appl. No.: 13/286,356

(22) Filed: Nov. 1, 2011

(65) Prior Publication Data

US 2013/0108223 A1    May 2, 2013

(51) Int. Cl.
*G02B 6/36* (2006.01)

(52) U.S. Cl.
USPC .................................. 385/89; 385/88; 385/93

(58) Field of Classification Search
USPC ....................................................... 385/88–94
See application file for complete search history.

(56) References Cited

U.S. PATENT DOCUMENTS

| | | | | |
|---|---|---|---|---|
| 4,989,934 A | * | 2/1991 | Zavracky et al. | 385/14 |
| 5,432,630 A | * | 7/1995 | Lebby et al. | 398/116 |
| 5,539,200 A | * | 7/1996 | Lebby et al. | 250/227.11 |
| 6,847,103 B1 | | 1/2005 | Perez et al. | |
| 6,896,422 B2 | * | 5/2005 | Bennett et al. | 385/92 |
| 7,088,530 B1 | | 8/2006 | Recco et al. | |
| 7,435,014 B2 | | 10/2008 | Rosenberg et al. | |
| 7,452,139 B2 | * | 11/2008 | Wang et al. | 385/92 |
| 7,708,475 B2 | | 5/2010 | Wong et al. | |
| 8,200,056 B2 | * | 6/2012 | Baugh | 385/49 |
| 2005/0205771 A1 | | 9/2005 | Sherrer et al. | |
| 2006/0067630 A1 | | 3/2006 | Kim | |
| 2008/0044140 A1 | | 2/2008 | Wang et al. | |
| 2009/0297159 A1 | | 12/2009 | Margolin et al. | |
| 2009/0310907 A1 | | 12/2009 | Ikeda et al. | |

* cited by examiner

*Primary Examiner* — Ellen Kim

(57) ABSTRACT

A leadframe of a parallel optical communications module has tapered protrusions disposed on an upper surface thereof that are positioned and shaped to mate with respective tapered openings formed in a lower surface of an optics module of the parallel optical communications module. The tapered protrusions are used as fiducial marks during a mounting process during which an array of optoelectronic devices is positioned, oriented and secured to the upper surface of the leadframe. Subsequently, during a passive alignment process, the lower surface of the optics module is placed in contact with the upper surface of the leadframe such that the tapered protrusions of the leadframe mate with respective tapered openings formed in the optics module, which causes the optoelectronic devices to come into precise optical alignment with the respective lenses.

20 Claims, 4 Drawing Sheets

METHOD AND APPARATUS FOR USE IN A PARALLEL OPTICAL COMMUNICATIONS SYSTEM FOR PASSIVELY ALIGNING AN OPTICS MODULE WITH OPTOELECTRONIC DEVICES OF THE PARALLEL OPTICAL COMMUNICATIONS MODULE

TECHNICAL FIELD OF THE INVENTION

The invention relates to parallel optical communications modules. More particularly, the invention relates to a method and an apparatus for passively and precisely aligning an optics system of a parallel optical communications module with optoelectronic devices of the parallel optical communications module during assembly of the parallel optical communications module.

BACKGROUND OF THE INVENTION

A typical parallel optical communications module includes a circuit board, such as a printed circuit board (PCB), a leadframe mounted on and electrically coupled to the circuit board, one or more integrated circuits (ICs) mounted on the leadframe, an array of optoelectronic devices mounted on the leadframe, a plurality of bond wires interconnecting the ICs with the circuit board and with the array of optoelectronic devices, and an optics system for coupling light between the ends of a plurality of optical fibers and respective optoelectronic devices of the array.

The optoelectronic devices may be light sources, such as laser diodes or light emitting diodes (LEDs), and/or light detectors, such as photodiodes. The ICs may include a laser diode driver IC and/or a receiver IC. If the parallel optical communications module is a parallel optical transmitter module, the optoelectronic devices are typically either laser diodes or LEDs and the IC is a driver IC that delivers electrical signals to the laser diodes or LEDs to cause them to produce optical data signals. If the parallel optical communications module is a parallel optical receiver module, the optoelectronic devices are typically photodiodes and the IC is a receiver IC that processes the electrical signals produced by the photodiodes to recover the data contained in the optical data signals. If the parallel optical communications module is a parallel optical transceiver module, the optoelectronic devices typically include laser diodes or LEDs and photodiodes, and the ICs typically include a laser diode driver IC and a receiver IC.

When a parallel optical communications module of the type described above is assembled, the optics system must be precisely aligned with the array of optoelectronic devices in order to ensure that the optical data signals are properly coupled between the ends of the optical fibers and the optoelectronic devices. Otherwise, the integrity of the optical data signals will degrade, which will detrimentally affect the performance of the module. Therefore, great care is taken during the assembly process to ensure that the optics system and the array of optoelectronic devices are in precise alignment.

In parallel optical communications modules of the type described above, active alignment systems are typically used to align the optics system with the array of optoelectronic devices during the assembly process. To accomplish the alignment process, a machine vision system of the active alignment system locates fiducial marks on the circuit board and uses them to align the optics system with the circuit board as the optics system is mounted. The fiducial marks are also used by the machine vision system to align the array of optoelectronic devices with the circuit board when the array is mounted on the leadframe. Using the fiducial marks in this manner to precisely position both the optics system and the array of optoelectronic devices on the circuit board should ensure that the optics system and the array of optoelectronic devices are in precise alignment with each other after they have been mounted.

While active alignment systems generally work well for their intended purposes, they are relatively expensive systems that increase the overall assembly cost. Passive alignment processes have also been used to align the optics systems with the optoelectronic device array during the assembly process. Typical passive alignment processes utilize pins on the module or circuit board and openings in the optics system that have reciprocal shapes for receiving the pins. One of the disadvantages of such passive alignment systems is that there are manufacturing tolerances associated with forming the pins and openings. These tolerances tend to accumulate and can result in the shapes and/or positions of the pins and/or the openings not being sufficiently precise to ensure precise alignment between the optics system and the array of optoelectronic devices.

A need exists for a passive alignment method and apparatus that ensure precise alignment between the optics system and the array of optoelectronic devices.

SUMMARY OF THE INVENTION

The invention is directed to an apparatus and a method for use in a parallel optical communications module for passively aligning an optics module of the parallel optical communications module with optoelectronic devices of the parallel optical communications module. The apparatus comprises a leadframe, at least first and second protrusions disposed on the upper surface of the leadframe at first and second preselected locations, respectively, an array of optoelectronic devices secured to the upper surface of the leadframe at a third preselected location that has a particular positional relationship with respect to the first and second protrusions, and an optics module mounted on the upper surface of the leadframe and having first and second openings formed therein at first and second preselected locations. The optics module has a plurality of lenses disposed therein at a third preselected location that has a particular positional relationship with respect to the first and second openings formed in the optics module. The first and second protrusions are mated with the first and second openings, respectively, when the optics module is mounted on the leadframe. The mating of the first and second protrusions with the first and second openings, respectively, ensures that the lenses are in optical alignment with the respective optoelectronic devices.

The method comprises the following: providing a leadframe having an upper surface and a lower surface; disposing at least first and second protrusions on the upper surface of the leadframe at first and second preselected locations, respectively; using the first and second protrusions as fiducials when securing an array of optoelectronic devices to the upper surface of the leadframe at a third preselected location; providing an optics module having first and second openings formed at first and second preselected locations, respectively, in the optics module; and mounting the optics module on the leadframe such that the first and second protrusions are mated with the first and second openings, respectively. The mating of the first and second protrusions with the first and second openings, respectively, ensures that the plurality of lenses are in optical alignment with the array of optoelectronic devices.

These and other features and advantages of the invention will become apparent from the following description, drawings and claims.

DETAILED DESCRIPTION OF AN ILLUSTRATIVE EMBODIMENT

Figure 1:
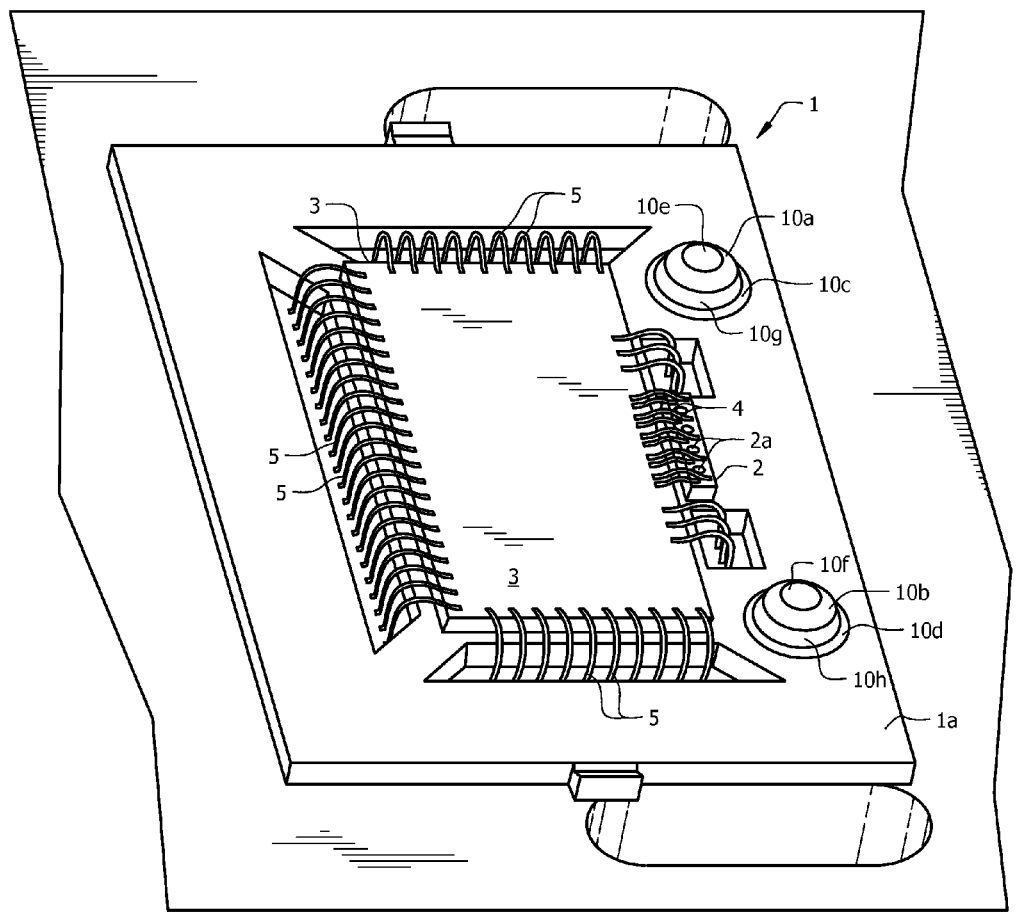
FIG. 1 illustrates a top perspective view of a leadframe of a parallel optical communications module (not shown for clarity) having two identical tapered protrusions formed thereon for performing interlocking and optical alignment functions.

In accordance with illustrative, or exemplary, embodiments, a leadframe of a parallel optical communications module has tapered protrusions disposed on an upper surface thereof that are positioned and shaped to mate with respective tapered openings formed in a lower surface of an optics module of the parallel optical communications module. The tapered protrusions disposed on the leadframe are used as fiducial marks during a mounting process during which an array of optoelectronic devices is positioned, oriented and secured to the upper surface of the leadframe. Subsequently, during a passive alignment process, the lower surface of the optics module is placed in contact with the upper surface of the leadframe such that the tapered protrusions of the leadframe are adjacent to, or in contact with, the respective tapered openings. The leadframe and the optics module are then pressed together to cause the respective tapered protrusions to mate with the respective tapered openings. When the optics module and the leadframe are fully engaged in this manner, the optoelectronic devices of the array are in precise optical alignment with respective lenses of the array.

The mating of the respective tapered protrusions with the respective tapered openings simultaneously performs the functions of interlocking the optics module with the leadframe and optically aligning the optics module with the array of optoelectronic devices mounted on the leadframe. Thus, the optical alignment process is a passive alignment process that is accomplished via the mating of the respective tapered protrusions with the respective tapered openings. Illustrative embodiments will now be described with reference to FIGS. 1-3, in which like reference numerals represent like components.

FIG. 1 illustrates a top perspective view of a leadframe 1 of a parallel optical communications module (not shown for clarity) having two identical tapered protrusions 10a and 10b formed thereon. The tapered protrusions 10a and 10b are typically integrally formed in the leadframe 1, which comprises a piece of metal material (e.g., copper) that is typically shaped by a known stamping process. Alternatively, the tapered protrusions 10a and 10b may be parts that are separate from the leadframe 1 and fixedly secured to the leadframe 1. The tapered protrusions 10a and 10b have base portions 10c and 10d, respectively, and top portions 10e and 10f, respectively. The tapered protrusions 10a and 10b have mid portions 10g and 10h, respectively, which extend from the base portions 10c and 10d, respectively, to the top portions 10e and 10f, respectively.

The mid portions 10g and 10h are tapered in that they have greater widths near the base portions 10c and 10d and smaller widths near the top portions 10e and 10f, respectively, and the widths adjust in a continuous manner. Thus, the tapering along the mid portions 10g and 10h is continuous, i.e., there are no abrupt changes in width along the outer surfaces of the mid portions 10g and 10h when moving in directions away from the base portions 10c and 10d and toward the top portions 10e and 10f, respectively, and vice versa. The transition regions where the mid portions 10g and 10h transition into the top portions 10e and 10f, respectively, are also continuous.

An array 2 of optoelectronic devices 2a is mounted on an upper surface 1a of the leadframe 1. The array 2 is typically a semiconductor chip having a plurality of the optoelectronic devices 2a integrated therein. An IC 3 is also mounted on the upper surface 1a of the leadframe 1. The optoelectronic devices 2a may be laser diodes and/or photodiodes, depending on whether the module is a transmitter module, a receiver module or a transceiver module. The IC 3 is either a laser diode driver IC or a receiver IC, depending on whether the optoelectronic devices 2a are laser diodes or photodiodes. Bond wires 4 are used to electrically interconnect the optoelectronic devices 2a with the IC 3. Bond wires 5 are used to electrically interconnect the IC 3 with a circuit board (not shown for purposes of clarity) on which the leadframe 1 is mounted.

In order to mount the array 2 of optoelectronic devices 2a on the upper surface 1a of the leadframe 1, the tapered protrusions 10a and 10b are used as fiducial marks by a machine vision system (not shown for purposes of clarity). As is known in the art, a machine vision system uses optical imaging techniques to acquire images of fiducial marks and of a device being mounted and determines the relative location of the device being mounted relative to the fiducial marks. As the machine vision system acquires these images and makes these determinations, it sends control signals to an automated assembly tool to cause the tool to orient the device and place it on the mounting surface at a preselected location relative to the fiducial marks. The continuously-varying tapered shapes of the tapered protrusions 10a and 10b is advantageous in that it allows the machine vision system to acquire continuously-varying grey scale images that can be easily processed by the system in order to find the centers of the top portions 10e and 10f of the protrusions 10a and 10b, respectively. This type of known machine vision system and placement process is used to orient the array 2 relative to the centers of the top portions 10e and 10f of the tapered protrusions 10a and 10b, respectively, and to then place the array 2 on the upper surface 1a of the leadframe 1 at the precise intended location. Typically, an adhesive material, such as epoxy, is used to fixedly secure the array 2 to the upper surface 1a of the leadframe 1.

Figure 2A:
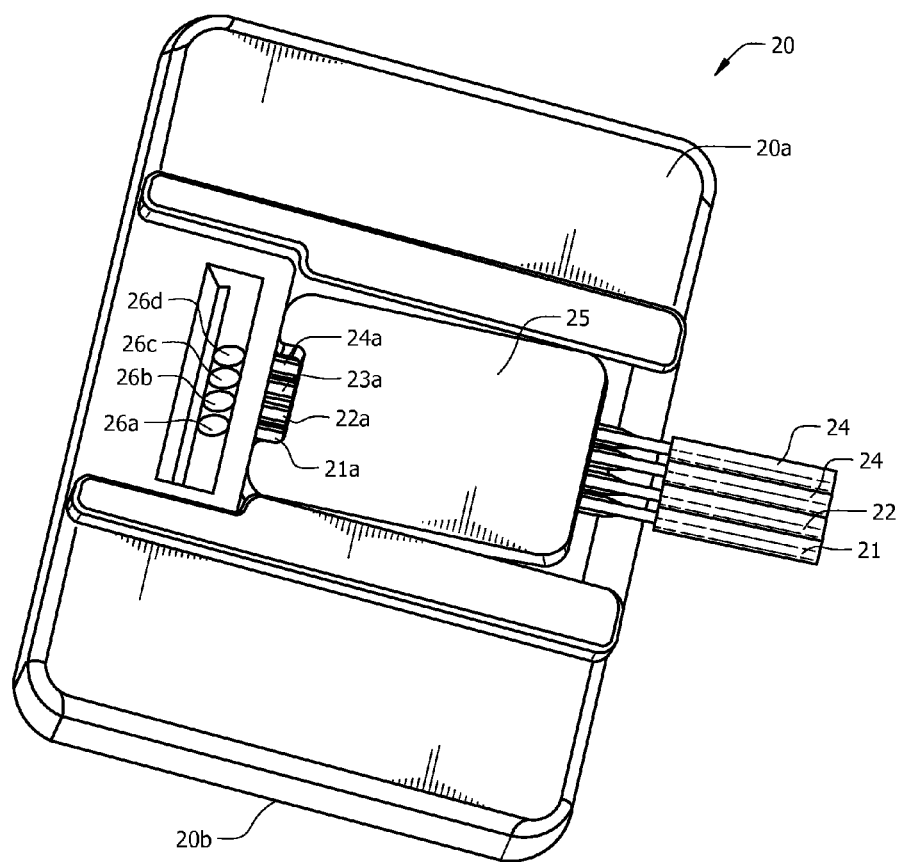
FIG. 2A illustrates a top perspective view of an optics module in accordance with an illustrative embodiment that is configured to be mounted on the leadframe shown in FIG. 1.
Figure 2B:
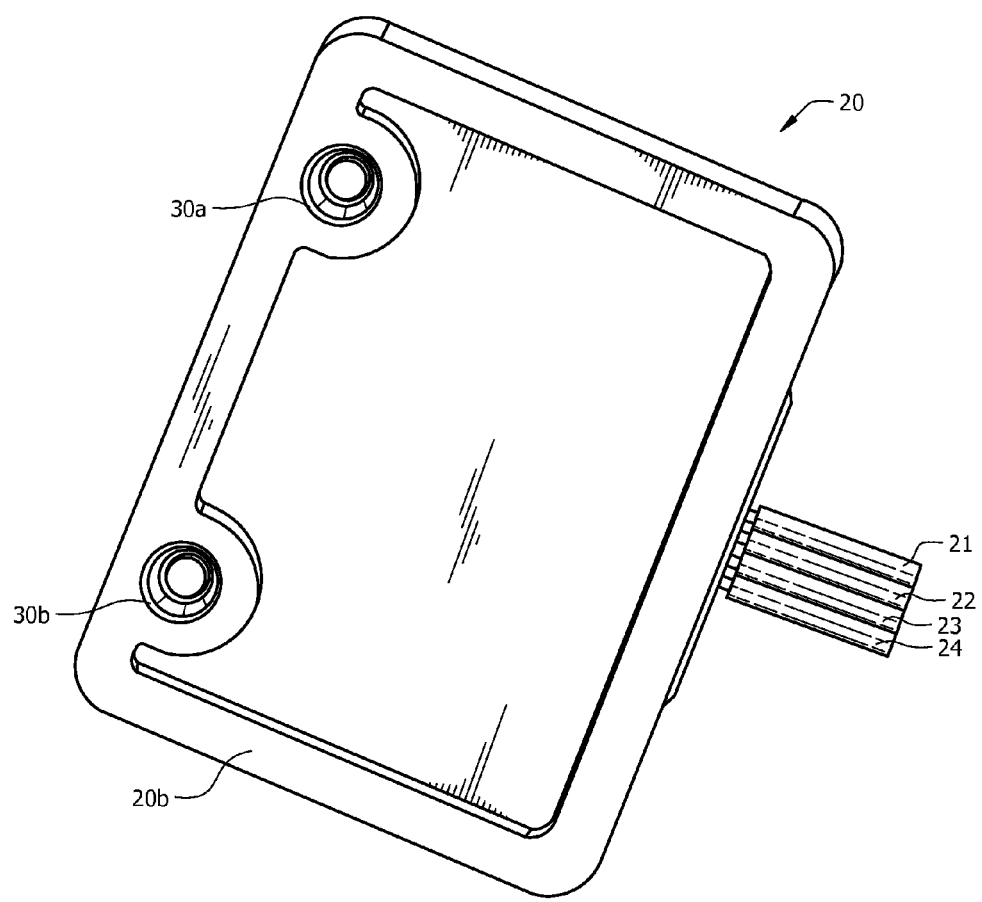
FIG. 2B illustrates a bottom perspective view of the optics module shown in FIG. 2A.

FIG. 2A illustrates a top perspective view of an optics module 20, in accordance with an illustrative embodiment, that is configured to be mounted on the leadframe 1 shown in FIG. 1. FIG. 2B illustrates a bottom perspective view of the optics module 20 shown in FIG. 2A. In accordance with this illustrative embodiment, the optics module 20 holds ends 21a-24a of four optical fibers 21-24, respectively. The ends 21a-24a are held in place by a cover 25 that presses the ends 21a-24a against V-grooves (not shown for purposes of clarity) formed in an upper surface 20a of the optics module 20. The optics module 20 includes a plurality of lenses 26a-26d for coupling respective optical signals between the respective ends 21a-24a of the respective fibers 21-24, respectively, and respective optoelectronic devices 2a of the array 2 (FIG. 1). The lenses 26a-26d change the direction of propagation of the optical signal impinging thereon by an angle of approximately 90° through reflection. Thus, the lenses 26a-26d are reflective lenses, such as total internal reflection (TIR) lenses, for example, although a variety of reflective lenses may be used for this purpose.

As can be seen in FIG. 2B, a lower surface 20b of the optics module 20 has tapered openings 30a and 30b formed therein that are shaped and sized to mate with the tapered protrusions 10a and 10b, respectively, disposed on the leadframe 1 (FIG. 1). The optics module 20 is typically made of a molded plastic material, such as polyetherimide (PEI), for example. During the manufacturing process, the lenses 26a-26d and the tapered openings 30a and 30b are formed at precise locations in the module 20 relative to one another. The precise positioning of the lenses 26a-26d relative the tapered openings 30a and 30b and the precise positioning of the array 2 relative to the centers of the top portions 10e and 10f of the tapered protrusions 10a and 10b, respectively, ensures that the lenses 26a-26d are precisely aligned with the respective optoelectronic devices 2a when the optics module 20 is mounted on the leadframe 1 such that the tapered protrusions 10a and 10b are fully engaged with the tapered openings 30a and 30b, respectively.

Figure 3:
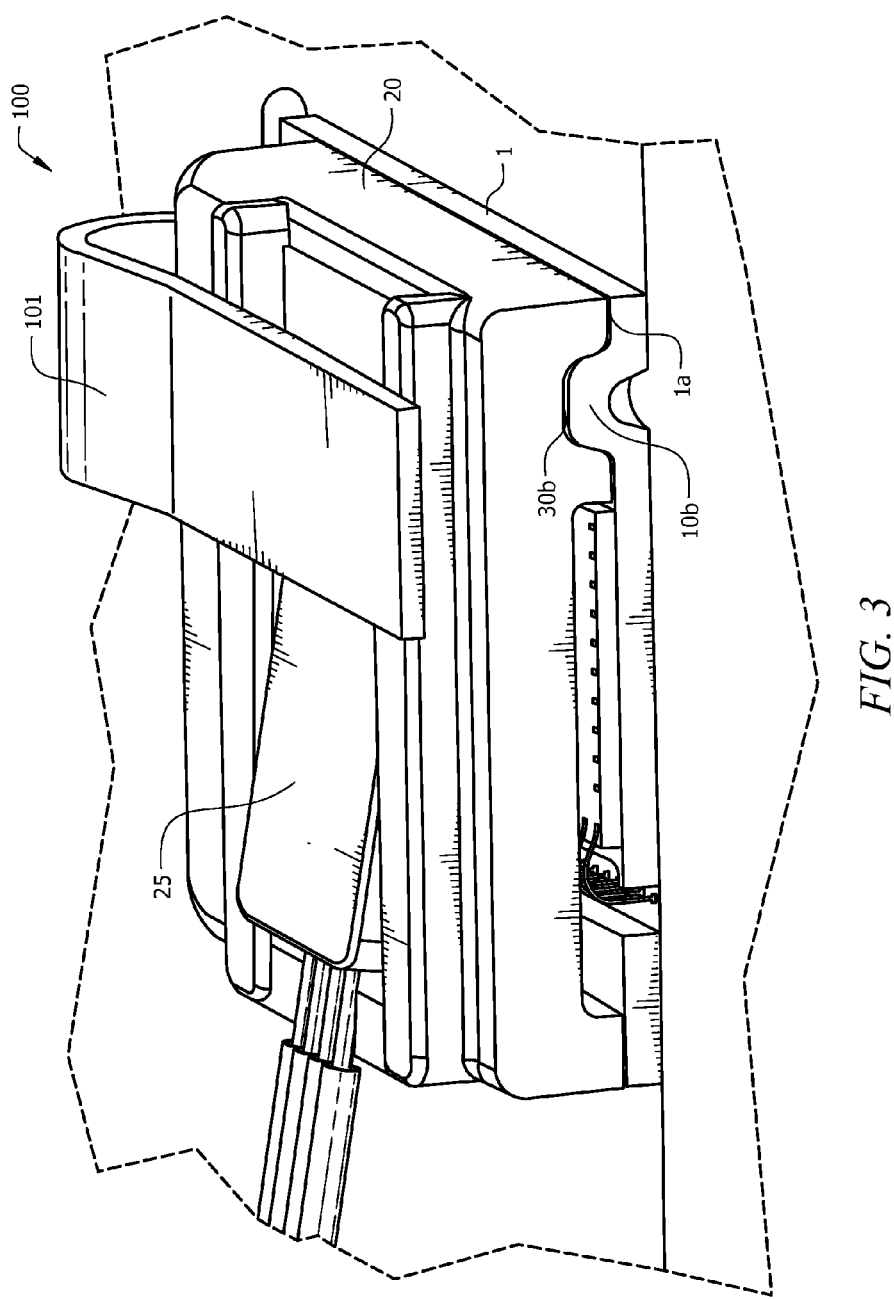
FIG. 3 illustrates a cross-sectional, perspective view of an optical communications system comprising the leadframe and other components shown in FIG. 1 and the optics module shown in FIGS. 2A and 2B mounted on the leadframe.

FIG. 3 illustrates a cross-sectional, perspective view of an optical communications system 100 comprising the leadframe 1 shown in FIG. 1 having the components 2 and 3 mounted thereon and the optics module 20 shown in FIGS. 2A and 2B secured to the leadframe 1 such that the tapered protrusions 10a and 10b are mated with the tapered opening 30a and 30b, respectively. In the cross-sectional view shown in FIG. 3, only the mated tapered protrusion 10b and tapered opening 30b are visible. As indicated above, in the mated position, the optoelectronic devices 2a of the array 2 are in precise optical alignment with the lenses 26a-26d of the optics module 20. The mating of the tapered protrusions 10a and 10b with the tapered openings 30a and 30b, respectively, also serves to interlock, or mechanically couple, the optics module 20 with the leadframe 1. A strap 101, which may be made of, for example, sheet metal, may also be used to provide a force that presses the optics module 20 against the leadframe 1 once they have been placed in the interlocked state shown in FIG. 3.

It can be seen from the description above that the tapered protrusions 10a and 10b and the tapered openings 30a and 30b serve the dual functions of performing passive optical alignment and mechanical coupling. This eliminates the need to use an active alignment process and a machine vision system to optically align and mechanically couple the optics module 20 with the leadframe 1. In addition, the precise positioning of the protrusions 10a and 10b relative to the array 2 of optoelectronic devices 2a and the precise positioning of the lenses 26a-26d relative the tapered openings 30a and 30b ensures that the lenses 26a-26d will be precisely optically aligned with the respective optoelectronic devices 2a of the array 2 when the optics module 20 is mounted on the leadframe 1. This precision optical alignment ensures that optical coupling losses will be very low, which helps ensure good signal integrity.

It should be noted that the invention has been described with respect to illustrative embodiments for the purpose of describing the principles and concepts of the invention. The invention is not limited to these embodiments. For example, while the invention has been described with reference to a four-channel module, the module may have more than four channels or fewer than four channels. Also, while the protrusions 10a/10b and openings 30a/30b have been described as having particular shapes, other suitable shapes that achieve the goals of the invention may be used, as will be understood by persons skilled in the art in view of the description being provided herein. As will be understood by those skilled in the art in view of the description being provided herein, many modifications may be made to the embodiments described herein without deviating from the goals of the invention, and all such modifications are within the scope of the invention.

What is claimed is:

1. An apparatus for use in a parallel optical communications module for passively aligning an optics module of the parallel optical communications module with optoelectronic devices of the parallel optical communications module, the apparatus comprising:
a leadframe having an upper surface and a lower surface;
at least first and second protrusions disposed on the upper surface of the leadframe at first and second preselected locations, respectively;
an array of optoelectronic devices secured to the upper surface of the leadframe at a third preselected location, wherein the third preselected location is preselected to have a particular positional relationship with respect to the first and second protrusions to enable the first and second protrusions to be used as fiducials during placement and positioning of the array on the upper surface of the leadframe; and
an optics module mounted on the upper surface of the leadframe, the optics module having first and second openings formed in the optics module at first and second preselected locations, the optics module having a plurality of lenses disposed in the optics module at a third preselected location, wherein the third preselected location on the optics module is preselected to have a particular positional relationship with respect to the first and second openings formed in the optics module, and wherein the first and second protrusions are mated with the first and second openings, respectively, when the optics module is mounted on the leadframe, and wherein the mating of the first and second protrusions with the first and second openings, respectively, ensures that the plurality of lenses are in optical alignment with the array of optoelectronic devices.

2. The apparatus of claim 1, wherein the first and second protrusions are tapered protrusions, and wherein the first and second openings are tapered openings.

3. The apparatus of claim 2, wherein the first and second tapered protrusions each have a base portion, a top portion and a mid portion, wherein each mid portion extends from the respective base portion to the respective top portion, and wherein the tapering along the mid portions is continuous.

4. The apparatus of claim 3, wherein each tapered protrusion has a respective transition region that extends from a respective upper edge of the respective mid portion to a respective center of the respective top portion, and wherein each transition region is continuous.

5. The apparatus of claim 2, wherein each tapered protrusion is integrally formed in the leadframe.

6. The apparatus of claim 1, wherein the first and second protrusions and the first and second openings operate, respectively, as passive optical alignment devices to passively optically align the optics module with the leadframe when the first and second protrusions mate with the first and second openings, respectively.

7. The apparatus of claim 1, wherein the optoelectronic devices are laser diodes.

8. The apparatus of claim 1, wherein the optoelectronic devices are photodiodes.

9. The apparatus of claim 1, wherein the optoelectronic devices include laser diodes and photodiodes.

10. A method for use in a parallel optical communications module for passively aligning an optics module of the parallel optical communications module with optoelectronic devices of the parallel optical communications module, the method comprising:

providing a leadframe having an upper surface and a lower surface, the upper surface of the leadframe having at least first and second protrusions disposed thereon at first and second preselected locations, respectively;

using the first and second protrusions as fiducials when securing an array of optoelectronic devices to the upper surface of the leadframe at a third preselected location, wherein the third preselected location is preselected to have a particular positional relationship with respect to the first and second protrusions;

providing an optics module having first and second openings formed at first and second preselected locations, respectively, in the optics module, the optics module having a plurality of lenses disposed at a third preselected location in the optics module, wherein the third preselected location in the optics module is preselected to have a particular positional relationship with respect to the first and second openings formed in the optics module; and mounting the optics module on the leadframe such that the first and second protrusions are mated with the first and second openings, respectively, and wherein the mating of the first and second protrusions with the first and second openings, respectively, ensures that the plurality of lenses are in optical alignment with the array of optoelectronic devices.

11. The method of claim 10, wherein the first and second protrusions are tapered protrusions, and wherein the first and second openings are tapered openings.

12. The method of claim 11, wherein the first and second tapered protrusions each have a base portion, a top portion and a mid portion, wherein each mid portion extends from the respective base portion to the respective top portion, and wherein the tapering along the mid portions is continuous.

13. The method of claim 12, wherein each tapered protrusion has a respective transition region that extends from a respective upper edge of the respective mid portion to a respective center of the respective top portion, and wherein each transition region is continuous.

14. The method of claim 1, wherein each tapered protrusion is integrally formed in the leadframe.

15. The method of claim 10, wherein the first and second protrusions and the first and second openings operate, respectively, as passive optical alignment devices to passively optically align the optics module with the leadframe when the first and second protrusions mate with the first and second openings, respectively.

16. The method of claim 10, wherein the optoelectronic devices are laser diodes.

17. The method of claim 10, wherein the optoelectronic devices are photodiodes.

18. The method of claim 10, wherein the optoelectronic devices include laser diodes and photodiodes.

19. The apparatus of claim 1, wherein the optics module is made of a molded plastic material.

20. The apparatus of claim 19, wherein the molded plastic material is polyetherimide.

* * * * *